United States Patent [19]

Koshiyama et al.

[11] 4,225,349
[45] Sep. 30, 1980

[54] COMPOSITIONS FOR POLISHING SYNTHETIC RESIN

[75] Inventors: Isamu Koshiyama, Nagoya; Tetsuji Senda, Nishikasugai, both of Japan

[73] Assignee: Fujimi Kenmazai Kogyo Co. Ltd., Nishikasugai, Japan

[21] Appl. No.: 902,989

[22] Filed: May 4, 1978

[30] Foreign Application Priority Data

Dec. 27, 1977 [JP] Japan .................................. 52-158237

[51] Int. Cl.$^2$ .............................................. B24B 1/00
[52] U.S. Cl. ........................................... 106/3; 51/308
[58] Field of Search ................ 51/307, 308; 106/3–11, 106/288

[56] References Cited

U.S. PATENT DOCUMENTS

| | | | |
|---|---|---|---|
| 50,862 | 11/1865 | Valentine | 51/307 |
| 1,128,287 | 2/1915 | Carmichael | 51/307 |
| 1,806,414 | 5/1931 | Patten | 51/307 X |
| 2,016,892 | 10/1935 | Clarvoe | 51/307 |
| 2,197,552 | 4/1940 | Kuzmick | 51/307 X |
| 2,734,812 | 2/1956 | Robie | 51/307 X |
| 2,915,475 | 12/1959 | Bugosh | 106/288 B |
| 3,361,581 | 1/1968 | Drescher | 106/11 |
| 3,370,017 | 2/1968 | Bergna et al. | 106/3 X |
| 3,950,478 | 4/1976 | Kenworthy et al. | 106/288 B X |

*Primary Examiner*—Lorenzo B. Hayes
*Assistant Examiner*—Amelia B. Yarbrough
*Attorney, Agent, or Firm*—Dennison, Dennison, Meserole & Pollack

[57] ABSTRACT

A composition for polishing synthetic resin comprises a calcined alumina polishing agent and water. The polishing agent is prepared by burning boehmite, crushing it into particles and separating particles having a predetermined particle distribution. Also disclosed is a synthetic resin polishing composition further containing as a polishing accelerator an aluminum compound selected from among aluminum nitrate, polyaluminum chloride, aluminum bromide, aluminum sulfate, aluminum iodide, aluminum chloride and aluminum phosphate and mixtures thereof.

36 Claims, No Drawings

COMPOSITIONS FOR POLISHING SYNTHETIC RESIN

This invention relates to improved compositions for polishing synthetic resin in the form of, for example, a lens or a gear.

A polishing composition of this sort known in the art is an aqueous slurry of a white fused alumina polishing agent made by fusing gibbsite ($Al_2O_3.3H_2O$ or $Al(OH)_3$) at a temperature of 2,050° C. or higher, cooling it into a solid mass, crushing the mass into particles and separating particles having a predetermined particle size distribution. This slurry is, however, unsatisfactory for its low polishing efficiency. It requires a long time to produce a satisfactory smooth and glossy surface on the synthetic resin to be polished. The use of the polishing agent in larger particles to improve the polishing efficiency of the slurry results in an undesirable tendency of the polished surface to acquire orange peels, scratches or like defects.

There is also known a polishing composition for synthetic resin further containing as a polishing accelerator an aluminum compound, such as aluminum nitrate, polyaluminum chloride, aluminum bromide, aluminum sulfate, aluminum iodide and aluminum chloride. This polishing composition has been invented by the inventors of the present invention to eliminate the aforementioned drawbacks and improve the efficiency of polishing operation without the appearance of any defect on the polished surface. This polishing composition is, however, still not entirely satisfactory, though it has been a considerably great improvement.

It is, therefore, an object of this invention to provide, in view of the drawbacks of the known polishing compositions as summarized in the preceding two paragraphs, an improved polishing composition which makes it possible to polish a product of synthetic resin with a high efficiency without leaving any defect or blemish on the polished surface.

This invention is based on the discovery by the inventors that calcined alumina obtained by burning boehmite ($Al_2O_3.H_2O$ or $AlO(OH)$), crushing it and separating particles having a predetermined particle size distribution is a better agent for polishing synthetic resin than the aforementioned white fused alumina.

According to this invention, therefore, calcined alumina is substituted as a polishing agent for the white fused alumina employed in the aforementioned known polishing compositions. This invention, thus, provides a composition for polishing synthetic resin which is composed of calcined alumina as a polishing agent and water. The calcined alumina is obtained by burning boehmite, crushing it and separating particles having a predetermined particle size distribution as hereinabove stated. This invention also provides a compostion for polishing synthetic resin further containing as a polishing accelerator an aluminum compound selected from among aluminum nitrate, polyaluminum chloride, aluminum bromide, aluminum sulfate, aluminum iodide, aluminum chloride and aluminum phosphate and mixtures thereof.

As is obvious from a description of the results of comparative tests which will hereinafter appear, the polishing compositions of this invention, whether containing a polishing accelerator or not, show a higher polishing effectiveness for synthetic resin than those known in the art and are capable of polishing synthetic resin efficiently without producing any defect on the polished surface. It is also to be noted that the polishing composition of this invention containing a polishing accelerator shows a higher polishing effectiveness than the prior art polishing composition containing a polishing accelerator, as well as than the polishing composition of this invention containing no polishing accelerator.

The invention will now be described in further detail by way of example with reference to the results of a series of comparative tests.

A polishing composition embodying this invention is composed of a slurry formulated by suspending a calcined alumina polishing agent in distilled water. The polishing agent is prepared by burning granular boehmite ($Al_2O_3.H_2O$ or $AlO(OH)$) having a particle size of 1 to 100 microns in a crucible in an electric furnace at a temperature of 1,100° C. to 1,200° C. for 2 to 3 hours, crushing relatively large particles into finer particles and separating particles falling within a predetermined particle size distribution. The slurry contains from 5% to 50% by weight of the polishing agent. The polishing agent has a particle size of 20 microns or less.

A series of polishing compositions further embodying this invention each contain a minor amount of an aluminum compound selected from among aluminum nitrate ($Al(NO_3)_3.9H_2O$), polyaluminum chloride (($Al_2(OH)_nCl_{6-n})_m$), aluminum bromide ($AlBr_3$), aluminum sulfate ($Al_2(SO_4)_3$), aluminum iodide ($AlI_3$), aluminum chloride ($AlCl_3$) and aluminum phosphate ($AlPO_4$) as a polishing accelerator for increasing the polishing effectiveness of the polishing agent in the slurry.

Further details of these polishing compositions will appear in the description of the comparative tests.

In order to polish a product of synthetic resin with any of these polishing compositions using an appropriate polishing pad, the polishing composition is supplied into a clearance between the surface of the product and the surface of the polishing pad which is slidable on the surface of the product.

Description will now be made of a series of comparative tests conducted to ascertain the advantages of this invention.

(1) Tests for comparison between the polishing compositions of this invention and those known in the art (Tests No. 1 to 7):

A group of polishing compositions embodying this invention were prepared in the form of slurries each formulated by suspending 50 grams of the calcined alumina polishing agent in 200 cc of distilled water. This polishing agent was obtained as hereinbefore described. These slurries, except one, further contained 0.2, 1.2, 5.0, 10.0, 20.0 and 30.0%, respectively, by weight of aluminum nitrate ($Al(NO_3)_3.9H_2O$) as a polishing accelerator.

A corresponding number of known polishing compositions employed as standards of comparison were prepared in the form of slurries each formulated by suspending 50 grams of a white fused alumina polishing agent in 200 cc of distilled water. This white fused alumina was prepared by melting gibbsite ($Al_2O_3.3H_2O$ or $Al(OH)_3$) at a temperature of 2,050° C. or higher, cooling it into a solid mass, crushing the solid mass into particles and separating particles falling within a predetermined particle size distribution. These slurries, except one, each further contained aluminum nitrate as a polishing accelerator in the amount corresponding to one of the polishing compositions embodying this invention as shown in Table 2 below.

The particle size distribution of the polishing agent in the polishing compositions embodying this invention and that of the polishing agent in the known polishing compositions were as shown in Table 1 below.

TABLE 1

| PARTICLE SIZE DISTRIBUTION OF POLISHING AGENT | | |
|---|---|---|
| Particle Diameter | Invention | Prior Art |
| 3 microns and larger | 5.5% | 0% |
| Smaller than 3 microns but larger than 2 microns | 7.0% | 0% |
| 2 microns and smaller, but larger than 1 micron | 15.0% | 20.3% |
| 1 micron and smaller | 72.5% | 79.7% |

As seen from Table 1 above, the polishing agent in the polishing compositions embodying this invention has nearly the same particle size distribution as the polishing agent in the known polishing compositions.

The aforementioned polishing compositions embodying this invention and the corresponding known polishing compositions were each tested for their polishing effectiveness in the polishing of an allyldiglycol carbonate resin plate. For each of the tests, the resin plate was polished for 10 minutes on a polishing pad attached to the polishing plate of a lens polisher operating with a plate rotational frequency of 210 rpm and a polishing pressure of 90 g/cm$^2$. During each polishing, the slurry was applied between the polishing pad and the resin plate at a constant rate to maintain a constant concentration of the polishing agent. After polishing, the polished plate surface was examined for the presence of such defects as orange peels and scratches. Then, the resin plate was weighed to obtain its weight loss, whereby the removal rate of resin was figured out.

The test results are shown in Table 2 below.

TABLE 2

| | REMOVAL RATE AND SURFACE DEFECT | | | |
|---|---|---|---|---|
| | | Invention | | Prior Art |
| Test No. | Polishing Accelerator (aluminum nitrate, %) | Removal Rate (mg/10 min.) | Surface Defect | Removal Rate (mg/10 min.) | Surface Defect |
| 1 | Not added | 23.8 | None | 6.8 | Orange peels |
| 2 | 0.2 | 46.3 | " | 6.8 | Orange peels |
| 3 | 1.2 | 61.9 | " | 8.1 | Orange peels |
| 4 | 5.0 | 62.6 | " | 10.2 | Orange peels |
| 5 | 10.0 | 64.0 | " | 16.4 | Orange peels |
| 6 | 20.0 | 57.3 | " | 18.8 | Orange peels |
| 7 | 30.0 | 55.1 | " | 17.8 | Orange peels |

As can be seen from Table 2 above, the polishing compositions of this invention provide a better polishing efficiency with a higher removal rate than the known polishing compositions.

As shown in Table 2, no surface defect or blemish was found on any of the resin plates polished by using the polishing compositions of this invention, while orange peels were observed on the surfaces of all of the resin plates polished by using the known polishing compositions, whether they contained a polishing accelerator or not and regardless of the amount of the polishing accelerator contained.

(2) Tests for comparison between the polishing compositions of this invention containing a polishing accelerator and the polishing composition of this invention containing no such polishing accelerator (Tests No. 8 to 19):

A series of tests were conducted on a group of polishing compositions embodying this invention which had been prepared in the same manner as in Tests No. 2 to 7, but which contained different aluminum compounds as a polishing accelerator. Instead of aluminum nitrate used in Tests No. 2 to 7, the slurries herein tested contained as a polishing accelerator 1.0% and 5.0%, respectively, by weight of each of polyaluminum chloride $((Al_2(OH)_nCl_{6-n})_m)$, aluminum bromide $(AlBr_3)$, aluminum sulfate $(Al_2(SO_4)_3)$, aluminum iodide $(AlI_3)$, aluminum chloride $(AlCl_3)$ and aluminum phosphate $(AlPO_4)$. The tests were conducted using allyldiglycol carbonate resin plates in the same manner as in Tests No. 2 to 7. The polishing composition of this invention used in Test No. 1, which did not contain any polishing accelerator, was used as a control for Tests No. 8 to 19.

The results of these tests are shown in Table 3 below.

TABLE 3

| REMOVAL RATE AND SURFACE DEFECT | | | | |
|---|---|---|---|---|
| Test No. | Polishing Accelerator | Removal Rate | | Surface Defect |
| 1 | Not added | 23.8 | mg/10 min. | None |
| 8 | Polyaluminum chloride 1.0% | 37.7 | " | None |
| 9 | Polyaluminum chloride 5.0% | 34.2 | " | None |
| 10 | Aluminum bromide 1.0% | 59.2 | " | None |
| 11 | Aluminum bromide 5.0% | 45.1 | " | None |
| 12 | Aluminum sulfate 1.0% | 33.3 | " | None |
| 13 | Aluminum sulfate 5.0% | 25.5 | " | None |
| 14 | Aluminum iodide 1.0% | 42.8 | " | None |
| 15 | Aluminum iodide 5.0% | 45.1 | " | None |
| 16 | Aluminum chloride 1.0% | 56.1 | " | None |
| 17 | Aluminum chloride 5.0% | 62.2 | " | None |
| 18 | Aluminum phosphate 1.0% | 35.0 | " | None |
| 19 | Aluminum phosphate 5.0% | 29.5 | " | None |

It is evident from Table 3 that all of the polishing compositions of this invention containing a polishing accelerator provide a higher polishing efficiency with a greater removal rate than the polishing composition of this invention containing no polishing accelerator. Further, no surface defect was found on any of the resin plates polished using the polishing compositions of this invention containing a polishing accelerator.

It is also to be noted that the addition of only a small amount of a polishing accelerator can greatly increase the rate of removal or the polishing effectiveness of polishing compositions.

What we claim is:

1. An aqueous composition for polishing synthetic resin consisting essentially of a slurry of about 5 to 50% by weight of a polishing agent consisting of calcined boehmite of a particle size of about 20 microns or less and having a particle size distribution of about 5.5% being 3 microns and larger, about 7.0% being less than 3 microns and greater than 2 microns, about 15.0% being 2 microns and smaller dispersed or slurried in water but greater than 1 micron, and about 72.5% being about 1 micron and smaller.

2. A polishing composition as defined in claim 1, wherein said polishing agent is calcined alumina obtained by burning boehmite at a temperature between 1,100° C. and 1,200° C. for 2 to 3 hours, crushing it into particles and separating particles having a predetermined particle size distribution.

3. A polishing composition as defined in claim 1 or 2, further containing as a polishing accelerator an aluminum compound selected from the group consisting of aluminum nitrate, polyaluminum chloride, aluminum bromide, aluminum sulfate, aluminum iodide, aluminum chloride and aluminum phosphate and mixtures thereof.

4. A polishing composition as defined in claim 3, wherein said aluminum compound is aluminum nitrate.

5. A polishing composition as defined in claim 3, wherein said aluminum compound is polyaluminum chloride.

6. A polishing composition as defined in claim 3, wherein said aluminum compound is aluminum bromide.

7. A polishing composition as defined in claim 3, wherein said aluminum compound is aluminum sulfate.

8. A polishing composition as defined in claim 3, wherein said aluminum compound is aluminum iodide.

9. A polishing composition as defined in claim 3, wherein said aluminum compound is aluminum chloride.

10. A polishing composition as defined in claim 3, wherein said aluminum compound is aluminum phosphate.

11. A polishing composition as defined in claim 4, containing a maximum of 30% by weight of said aluminum compound.

12. A polishing composition as defined in claim 4, containing a maximum of 5% by weight of said aluminum compound.

13. A polishing composition as defined in claim 5, containing a maximum of 5% by weight of said aluminum compound.

14. A polishing composition as defined in claim 6, containing a maximum of 5% by weight of said aluminum compound.

15. A polishing composition as defined in claim 7, containing a maximum of 5% by weight of said aluminum compound.

16. A polishing composition as defined in claim 8, containing a maximum of 5% by weight of said aluminum compound.

17. A polishing composition as defined in claim 9, containing a maximum of 5% by weight of said aluminum compound.

18. A polishing composition as defined in claim 10, containing a maximum of 5% by weight of said aluminum compound.

19. In a process of polishing an article formed of synthetic resin with an aqueous polishing composition comprising an aqueous slurry of a polishing agent applied between the article and a polishing pad which is slideable on the article, the improvement comprising utilizing an aqueous polishing composition consisting essentially of a slurry of about 5 to 50% by weight of a polishing agent consisting of calcined boehmite of a particle size of about 20 microns or less and having a particle size distribution of about 5.5% being 3 microns and larger, about 7.0% being less than 3 microns and greater than 2 microns, about 15.0% being 2 microns and smaller but greater than 1 micron, and about 72.5% being about 1 micron and smaller dispersed or slurried in water.

20. A polishing process as defined in claim 19 wherein said polishing agent is calcined alumina obtained by burning boehmite at a temperature between 1,100° C. and 1,200° C. for 2 to 3 hours, crushing it into particles and separating particles having said predetermined particle size distribution.

21. A polishing process as defined in claim 19 or 20, wherein said slurry further contains as a polishing accelerator an aluminum compound selected from the group consisting of aluminum nitrate, polyaluminum chloride, aluminum bromide, aluminum sulfate, aluminum iodide, aluminum chloride and aluminum phosphate and mixtures thereof.

22. A polishing process as defined in claim 21, wherein said aluminum compound is aluminum nitrate.

23. A polishing process as defined in claim 21, wherein said aluminum compound is polyaluminum chloride.

24. A polishing process as defined in claim 21, wherein said aluminum compound is aluminum bromide.

25. A polishing process as defined in claim 21, wherein said aluminum compound is aluminum sulfate.

26. A polishing process as defined in claim 21, wherein said aluminum compound is aluminum iodide.

27. A polishing process as defined in claim 21, wherein said aluminum compound is aluminum chloride.

28. A polishing process as defined in claim 21, wherein said aluminum compound is aluminum phosphate.

29. A polishing process as defined in claim 22, containing a maximum of 30% by weight of said aluminum compound.

30. A polishing process as defined in claim 22, containing a maximum of 5% by weight of said aluminum compound.

31. A polishing process as defined in claim 23, containing a maximum of 5% by weight of said aluminum compound.

32. A polishing process as defined in claim 24, containing a maximum of 5% by weight of said aluminum compound.

33. A polishing process as defined in claim 25, containing a maximum of 5% by weight of said aluminum compound.

34. A polishing process as defined in claim 26, containing a maximum of 5% by weight of said aluminum compound.

35. A polishing process as defined in claim 27, containing a maximum of 5% by weight of said aluminum compound.

36. A polishing process as defined in claim 28, containing a maximum of 5% by weight of said aluminum compound.

* * * * *